US011741617B2

(12) United States Patent
Lee et al.

(10) Patent No.: US 11,741,617 B2
(45) Date of Patent: Aug. 29, 2023

(54) METHOD AND APPARATUS WITH OBJECT TRACKING

(71) Applicant: Samsung Electronics Co., Ltd., Suwon-si (KR)

(72) Inventors: Hyunjeong Lee, Seoul (KR); SeungWook Kim, Seoul (KR); Changbeom Park, Seoul (KR); Ju Hwan Song, Suwon-si (KR); Byung In Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 17/528,501

(22) Filed: Nov. 17, 2021

(65) Prior Publication Data

US 2022/0383514 A1 Dec. 1, 2022

(30) Foreign Application Priority Data

May 26, 2021 (KR) .................. 10-2021-0067481

(51) Int. Cl.
*G06K 9/00* (2022.01)
*G06T 7/246* (2017.01)
*G06V 10/22* (2022.01)
*G06F 18/213* (2023.01)

(52) U.S. Cl.
CPC ............ *G06T 7/248* (2017.01); *G06F 18/213* (2023.01); *G06V 10/22* (2022.01); *G06T 2207/20084* (2013.01)

(58) Field of Classification Search
CPC ........... G06T 7/248; G06T 2207/20084; G06T 2207/20081; G06T 2207/20104; G06T 7/246; G06T 2210/12; G06F 18/213; G06F 18/24; G06V 10/22; G06V 10/25
See application file for complete search history.

(56) References Cited

U.S. PATENT DOCUMENTS

| | | | |
|---|---|---|---|
| 10,269,125 B1* | 4/2019 | Kim | ...................... G06F 18/214 |
| 10,275,709 B2 | 4/2019 | Munteanu et al. | |
| 10,540,572 B1* | 1/2020 | Kim | .......................... G06T 5/50 |
| 10,825,188 B1 | 11/2020 | Tan et al. | |

(Continued)

FOREIGN PATENT DOCUMENTS

| | | | |
|---|---|---|---|
| KR | 10-1513931 B1 | 4/2015 | |
| KR | 10-1906796 B1 | 10/2018 | |

(Continued)

*Primary Examiner* — Dhaval V Patel
(74) *Attorney, Agent, or Firm* — NSIP Law

(57) ABSTRACT

A processor-implemented method with object tracking includes: determining an initial template image based on an input bounding box and an input image; generating an initial feature map by extracting features from the initial template image; generating a transformed feature map by performing feature transformation adapted to objectness on the initial feature map; generating an objectness probability map and a bounding box map indicating bounding box information corresponding to each coordinate of the objectness probability map by performing objectness-based bounding box regression analysis on the transformed feature map; and determining a refined bounding box based on the objectness probability map and the bounding box map.

25 Claims, 8 Drawing Sheets

(56) References Cited

U.S. PATENT DOCUMENTS

| | | |
|---|---|---|
| 2015/0178943 A1 | 6/2015 | Li et al. |
| 2017/0358086 A1 | 12/2017 | Dinu et al. |
| 2018/0253973 A1 | 9/2018 | Yang |
| 2018/0260613 A1 | 9/2018 | Gao |
| 2019/0304105 A1 | 10/2019 | Gao et al. |
| 2020/0250499 A1* | 8/2020 | Kim ..................... G06F 18/251 |

FOREIGN PATENT DOCUMENTS

| | | |
|---|---|---|
| KR | 10-1912570 B1 | 10/2018 |
| KR | 10-2020-0039547 A | 4/2020 |
| KR | 10-2020-0095335 A | 8/2020 |
| KR | 10-2020-0095387 A | 8/2020 |

* cited by examiner

METHOD AND APPARATUS WITH OBJECT TRACKING

CROSS-REFERENCE TO RELATED APPLICATIONS

This application claims the benefit under 35 USC § 119(a) of Korean Patent Application No. 10-2021-0067481 filed on May 26, 2021, in the Korean Intellectual Property Office, the entire disclosure of which is incorporated herein by reference for all purposes.

BACKGROUND

1. Field

The following description relates to a method and apparatus with object tracking.

2. Description of Related Art

Object tracking is a technique that may detect an object in consecutive images. When a bounding box of a target is set based on an input from a user in tracking an object in consecutive images, the bounding box may not be set accurately. While setting a bounding box on the screen of a smart phone or camera, the target may move or deform, or the smart phone or camera may be shaken. In addition, when the bounding box is set based on a touch input, the target may not be accurately pointed due to the thickness of a finger of the user.

In object tracking, a template image may be compared for subsequent object tracking. Thus, when the template image is inaccurate, the accuracy of object tracking may decrease. For example, when the template image includes only a part of the target or includes the background region much in addition to the target, the accuracy of object tracking may decrease.

A template image included in training data used to train a neural network may include not only a foreground region occupied by a target but also a background region other than the target. When the proportion of the foreground region is large, the neural network may perform object tracking robust against various background regions. However, when the proportion of the background region is overly large, it may be beyond the limit of the neural network, resulting in a decrease in the accuracy of object tracking.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with object tracking includes: determining an initial template image based on an input bounding box and an input image; generating an initial feature map by extracting features from the initial template image; generating a transformed feature map by performing feature transformation adapted to objectness on the initial feature map; generating an objectness probability map and a bounding box map indicating bounding box information corresponding to each coordinate of the objectness probability map by performing objectness-based bounding box regression analysis on the transformed feature map; and determining a refined bounding box based on the objectness probability map and the bounding box map.

The generating of the objectness probability map may include generating the objectness probability map by performing classification on the transformed feature map; and the generating of the bounding box map may include generating the bounding box map by performing localization on the transformed feature map.

The determining of the refined bounding box may include: determining a first temporary bounding box based on the objectness probability map and the bounding box map; and comparing an area of the input bounding box and an area of the first temporary bounding box.

The determining of the first temporary bounding box may include determining the first temporary bounding box based on bounding box information of a bounding box map corresponding to a highest probability of the objectness probability map.

The comparing of the area of the input bounding box and the area of the first temporary bounding box may include comparing a ratio of the input bounding box to the first temporary bounding box with a threshold.

The determining of the refined bounding box may include: determining a second temporary bounding box based on the objectness probability map and the bounding box map based on a result of the comparing; and determining the refined bounding box by comparing the first temporary bounding box and the second temporary bounding box.

The determining of the second temporary bounding box may include, in response to the ratio of the input bounding box to the first temporary bounding box being greater than the threshold, determining the second temporary bounding box based on the objectness probability map and the bounding box map.

The determining of the refined bounding box by comparing the first temporary bounding box and the second temporary bounding box may include: determining a first intersection of union (IOU) of the first temporary bounding box and the input bounding box; determining a second IOU of the second temporary bounding box and the input bounding box; and determining the refined bounding box by comparing the first IOU and the second IOU.

The determining of the refined bounding box by comparing the first IOU and the second IOU may include: in response to the first IOU being greater than the second IOU, determining the first temporary bounding box to be the refined bounding box; and in response to the second IOU being greater than or equal to the first IOU, determining the second temporary bounding box to be the refined bounding box.

In another general aspect, one or more embodiments include a non-transitory computer-readable storage medium storing instructions that, when executed by a processor, configure the processor to perform any one, any combination, or all operations and methods described herein.

In another general aspect, an apparatus with object tracking includes: one or more processors configured to: determine an initial template image based on an input bounding box and an input image; generate an initial feature map by extracting features of the initial template image; generate a transformed feature map by performing feature transformation adapted to objectness on the initial feature map; generate an objectness probability map and a bounding box map indicating bounding box information corresponding to each coordinate of the objectness probability map by performing objectness-based bounding box regression analysis on the transformed feature map; and determine a refined bounding box based on the objectness probability map and the bounding box map.

For the determining of the refined bounding box, the one or more processors may be configured to determine the refined bounding box based on bounding box information of a bounding box map corresponding to a highest probability of the objectness probability map.

The one or more processors may be configured to: for the generating of the objectness probability map, generate the objectness probability map by performing classification on the transformed feature map, and for the generating of the bounding box map, generate the bounding box map by performing localization on the transformed feature map.

For the determining of the refined bounding box, the one or more processors may be configured to: determine a first temporary bounding box based on the objectness probability map and the bounding box map, and compare an area of the input bounding box and an area of the first temporary bounding box.

For the determining of the first temporary bounding box, the one or more processors may be configured to determine the first temporary bounding box based on bounding box information of a bounding box map corresponding to a highest probability of the objectness probability map.

For the comparing of the area of the input bounding box and the area of the first temporary bounding box, the one or more processors may be configured to compare a ratio of the input bounding box to the first temporary bounding box with a threshold.

For the determining of the refined bounding box, the one or more processors may be configured to: determine a second temporary bounding box based on the objectness probability map and the bounding box map based on a result of the comparing, and determine the refined bounding box by comparing the first temporary bounding box and the second temporary bounding box.

For the determining of the second temporary bounding box, the one or more processors may be configured to, in response to the ratio of the input bounding box to the first temporary bounding box being greater than the threshold, determine the second temporary bounding box based on the objectness probability map and the bounding box map.

For the determining of the refined bounding box by comparing the first temporary bounding box and the second temporary bounding box, the one or more processors may be configured to: calculate a first intersection of union (IOU) of the first temporary bounding box and the input bounding box, calculate a second IOU of the second temporary bounding box and the input bounding box, and determine the refined bounding box by comparing the first IOU and the second IOU.

For the determining of the refined bounding box by comparing the first IOU and the second IOU, the one or more processors may be configured to: in response to the first IOU being greater than the second IOU, determine the first temporary bounding box to be the refined bounding box, and in response to the second IOU being greater than or equal to the first IOU, determine the second temporary bounding box to be the refined bounding box.

In another general aspect, a processor-implemented method with object tracking includes: generating an objectness probability map and a bounding box map by performing objectness-based bounding box regression analysis based on an input bounding box and an input image; determining a first temporary bounding box and a second temporary bounding box based on the maps; determining a refined bounding box to be either one of the first temporary bounding box and the second temporary bounding box by comparing the temporary bounding boxes; and performing object tracking based on the refined bounding box.

A proportion of the refined bounding box that is a background region may be less than a proportion of the input bounding box that is the background region.

The determining of first temporary bounding boxes may include determining the second temporary bounding box in response to an area ratio of the input bounding box to the first temporary bounding box being greater than the threshold.

The determining of the refined bounding box may include determining refined bounding box to be the second temporary bounding in response to an intersection of union (IOU) of the second temporary bounding box and the input bounding box being greater than or equal to an IOU of the first temporary bounding box and the input bounding box.

The performing of the object tracking may include determining a bounding box in a subsequent image based on the refined bounding box.

Other features and aspects will be apparent from the following detailed description, the drawings, and the claims.

Figure 1A:
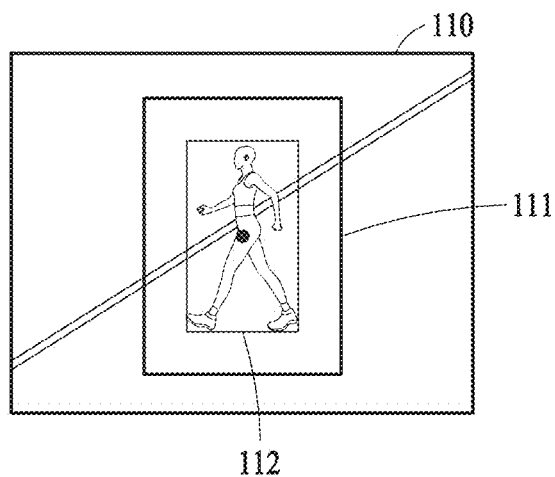
FIGS. 1A to 1C illustrate examples of comparing an input bounding box and an accurate bounding box.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for the purpose of describing particular examples only and is not to be limiting of the examples. As used herein, the singular forms "a", "an", and "the" are intended to include the plural forms as well, unless the context clearly indicates otherwise. As used herein, the term "and/or" includes any one and any combination of any two or more of the associated listed items. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

Figure 1B:
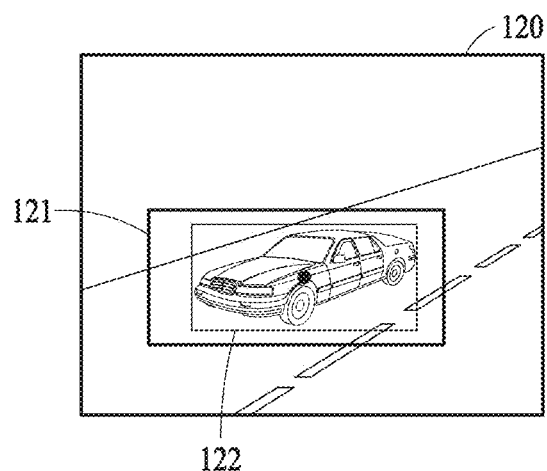
Figure 1C:
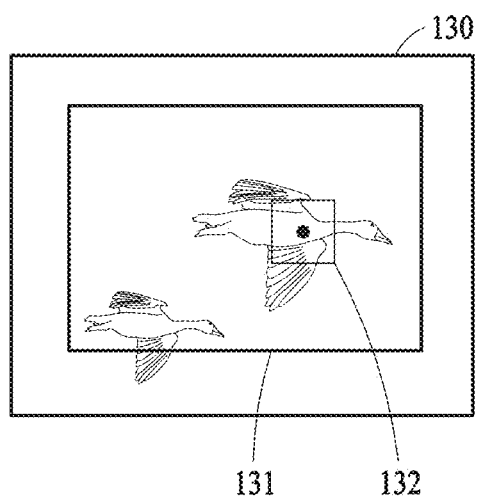

FIGS. 1A to 1C illustrate examples of comparing an input bounding box and an accurate bounding box.

An object tracking apparatus (e.g., an apparatus with object tracking) may refine a bounding box in a template image used to track an object. The object tracking apparatus may determine an input bounding box. The object tracking apparatus may determine a refined bounding box more appropriate for object tracking by refining the input bounding box. The object tracking apparatus of one or more embodiments may more accurately refine the template image used to track the object in consecutive images.

The consecutive images may be input to track the object. A template image of the object to be tracked may be obtained from an image of a first frame among the consecutive images. The template image may be input to a pre-trained neural network, and a feature map of the template image may be output therefrom. Images of subsequent consecutive frames among the consecutive images may each be input to the neural network, and feature maps of the respective images may be output therefrom. The same scale as a target in a template image may be maintained, and a similarity between an image of a subsequent frame and the template image as a search region may be calculated. A similarity between a feature map of the template image and a feature map of an image of the subsequent consecutive frame may be calculated through the neural network. The template image may refer to a representative image of the object to be tracked, and the search region or search image may refer to an image in which the object is to be detected.

For example, the object tracking apparatus may be applied to object tracking, zooming, and/or autofocusing of a camera. However, examples are not limited thereto. The object tracking apparatus may be applied to any case of tracking an object in consecutive images. The object tracking apparatus may be, or be applied to, a system such as a smart phone including a camera, a smart sensor, and/or a surveillance camera. The object tracking apparatus may also be, or be applied to, a system such as a computer that receives consecutive images from the outside. For example, the object tracking apparatus may be, or be applied to, an object tracking system using a smart sensor, an autofocus system of a camera, and/or a video-based surveillance system. However, examples are not limited thereto. The object tracking apparatus may be applied to any field of detecting a target in a predetermined image.

Here, the neural network may be pre-trained through training data. For the classification of an object by a backbone of the neural network, weights of the neural network may be updated through training. The neural network may be, for example, a Siamese network.

The object tracking apparatus may determine an input bounding box and determine an initial template image based on the input bounding box. For example, the object tracking apparatus may determine the input bounding box based on an input from a user, or determine the input bounding box based on tracking of a previous image. The object tracking apparatus may obtain the initial template image based on the input bounding box.

The object tracking apparatus may determine a larger region including the input bounding box, with the input bounding box at the center of the larger region (and/or with a center of the input bounding box at the center of the larger region), to be the initial template image. The object tracking apparatus may generate the initial template image with a predefined ratio or size based on the input bounding box designated by the user. For example, the object tracking apparatus may obtain an initial template image twice larger than the initial bounding box, with the input bounding box at the center.

The initial template image may be referred to as an input patch. Here, the generated input patch may pass through one or more filters (e.g., of a neural network), such that a feature map may be extracted. For example, the filters may have weights trained to obtain features of an object, and may convolutionally extract the features while maintaining information on the position of a signal of an image.

The object tracking apparatus may extract features of the initial template image and perform feature transformation to determine objectness. A feature map extracted from the initial template image may be referred to as an initial feature map. A feature map extracted from the initial template image through feature transformation may be transformed to be used for objectness determination. The feature map that is transformed may be referred to as a transform feature map. The object tracking apparatus may determine objectness based on feature values obtained from the template image.

The object tracking apparatus may correct the position and size of the bounding box based on a region having strong objectness. The object tracking apparatus may calculate an objectness probability based on the transformed feature map, and output a bounding box having a highest probability as a refined bounding box.

The object tracking apparatus may perform objectness-based bounding box regression (Bbox Regression) using the neural network. The object tracking apparatus may calculate a probability of each point in the transformed feature map being an object by using the neural network, and obtain information of a bounding box at each point. The neural network may learn various shapes and scales of objects. The neural network may stochastically learn the presence or absence of an object using training data including ground truth bounding box information for a template image. Here, an object class label may not be used.

Objectness-based bounding box regression analysis may include classification and localization. The object tracking apparatus may determine whether the object is present at an arbitrary position in the transformed feature map through classification. The object tracking apparatus may estimate the bounding box, assuming that the object is present at an arbitrary position in the transformed feature map, through localization on the transformed feature map. The object tracking apparatus may perform localization through a neural network that has learned in advance bounding box information for each point in the objectness probability map, such as, for example, a region proposal network.

The object tracking apparatus may determine one or more temporary bounding boxes by performing the objectness-based bounding box regression analysis one or more times. When an initial temporary bounding box has been determined, the object tracking apparatus may determine whether to determine another temporary bounding box by comparing an area of the input bounding box with an area of the initially determined temporary bounding box. In response to a difference between, or ratio of, the area of the input bounding box and the area of the initially determined temporary bounding box being large (e.g., greater than a predetermined threshold), the object tracking apparatus may determine another temporary bounding box. The large difference between the area of the input bounding box and the area of the initially determined temporary bounding box may indicate a possibility that the initially determined temporary bounding box substantially includes an unnecessary background region.

$$\frac{Area_{iBox}}{Area_{rBbox}} > Th\_Area \qquad \text{Equation 1}$$

For example, the object tracking apparatus may determine whether to additionally obtain a temporary bounding box using Equation 1 above, for example. According to Equation 1, the object tracking apparatus may compare an area ratio of the initial or input bounding box $Area_{iBbox}$ to the temporary bounding box $Area_{rBbox}$ with a threshold Th_Area. In response to the area ratio of the initial bounding box $Area_{iBbox}$ to the temporary bounding box $Area_{rBbox}$ being greater than the threshold Th_Area, the object tracking apparatus may determine a subsequent temporary bounding box.

The object tracking apparatus may perform bounding box comparative analysis on a plurality of temporary bounding boxes. Through the bounding box comparative analysis, the object tracking apparatus may derive results more robust against changes in the scale of the object. The object tracking apparatus may determine a refined bounding box through a comparison of a common region of each of the plurality of temporary bounding boxes and the initial bounding box. The object tracking apparatus may determine the refined bounding box by comparing an intersection of union (IOU) of each temporary bounding box and an IOU of the initial bounding box. An IOU may be a ratio of an intersection to a union of the area of the temporary bounding box and the area of the initial bounding box.

$$IOU_{rBbox1} > IOU_{rBbox2}\text{:Determine to be rBbox1}$$

$$IOU_{rBbox1} \leq IOU_{rBbox2}\text{:Determine to be rBbox2} \qquad \text{Equation 2}$$

For example, the object tracking apparatus may determine the refined bounding box using Equation 2 above, for example. In response to $IOU_{rBbox1}$ (which is a first IOU of a first temporary bounding box rBbox1 and the input bounding box) being greater than $IOU_{rBbox2}$ (which is a second IOU of a second temporary bounding box rBbox2 and the input bounding box), the object tracking apparatus may output the first temporary bounding box rBbox1 as the refined bounding box. Alternatively, in response to $IOU_{rBbox2}$ being greater than or equal to $IOU_{rBbox1}$, the object tracking apparatus may output the second temporary bounding box rBbox2 as the refined bounding box.

The object tracking apparatus may obtain a refined template image based on the refined bounding box. For example, the object tracking apparatus may determine a larger region including the refined bounding box, with the refined bounding box at the center of the larger region (and/or with a center of the refined bounding box at the center of the larger region), to be the refined template image. For example, the object tracking apparatus may obtain a refined template image twice larger than the refined bounding box, with the refined bounding box at the center.

The object tracking apparatus may obtain the refined template image based on the refined bounding box and use the refined template image to track the object in a subsequent frame. A similarity between the feature map of the template image including the target and the feature map of the search region may be calculated. For example, the similarity may be calculated through a cross-correlation method. The object tracking apparatus may estimate a bounding box indicating the position and region of the target based on a result of calculating the similarity.

The object tracking apparatus may crop a central region of the feature map of the template image. The object tracking apparatus may determine the similarity by comparing a result of the cropping on the feature map of the template image with the feature map of the search region. The object tracking apparatus may estimate a region that has high similarity and corresponds to the feature map of the search region to be the target region.

As described above, the object tracking apparatus of one or more embodiments may remove an unnecessary region from the initial bounding box and determine a bounding box more adapted to the object. Through this, the object tracking apparatus of one or more embodiments may increase the accuracy of object tracking.

Referring to FIG. 1A, a bounding box 111 is a bounding box determined from an input image 110 by a typical technique. A bounding box 112 is a bounding box (e.g., a refined bounding box) determined from the input image 110 by the object tracking apparatus of one or more embodiments. In an example, a proportion of the bounding box 112 that is a background region is less than a proportion of the bounding box 111 that is the background region. Since the bounding box 111 includes much of a background region other than an object, the accuracy of subsequent object tracking may decrease. In contrast, since the bounding box 112 determined by the object tracking apparatus of one or more embodiments includes the object more accurately and less of the unnecessary background region, the accuracy of subsequent object tracking may increase.

Referring to FIG. 1B, a bounding box 121 is a bounding box determined from an input image 120 by the typical technique. A bounding box 122 is a bounding box determined from the input image 120 by the object tracking apparatus of one or more embodiments. Since the bounding box 121 includes much of a background region other than an object, the accuracy of subsequent object tracking may decrease. In contrast, since the bounding box 122 determined by the object tracking apparatus of one or more embodiments includes the object more accurately and the unnecessary background region less, the accuracy of subsequent object tracking may increase.

Referring to FIG. 10, a bounding box 131 is a bounding box determined from an input image 130 by the typical technique. A bounding box 132 is a bounding box determined from the input image 130 by the object tracking apparatus of one or more embodiments. Since the bounding box 131 includes much of a background region other than an object, the accuracy of subsequent object tracking may decrease. In contrast, since the bounding box 132 determined by the object tracking apparatus of one or more embodiments includes the object more accurately and the unnecessary background region less, the accuracy of subsequent object tracking may increase.

Figure 2:
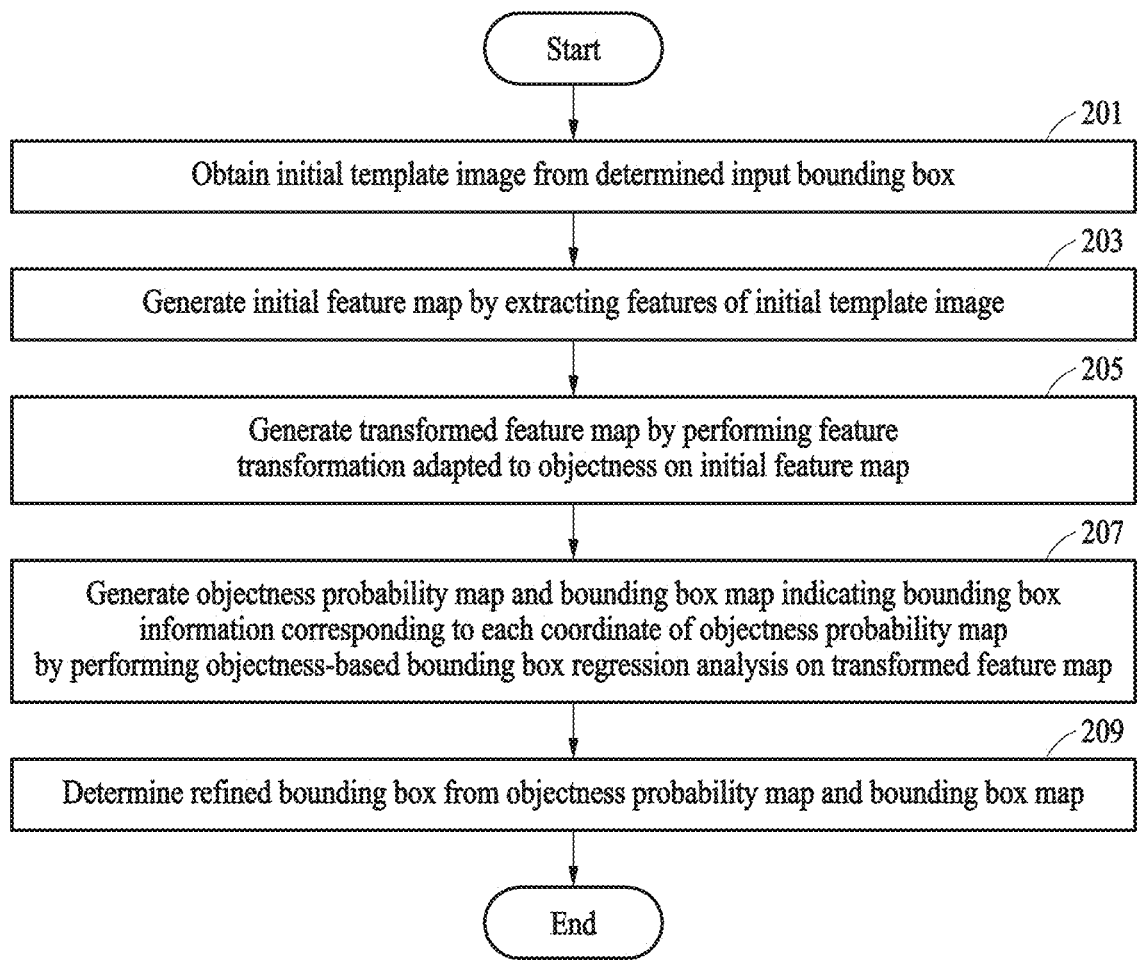
FIG. 2 is a flowchart illustrating an example of an object tracking method.

FIG. 2 is a flowchart illustrating an example of an object tracking method.

Referring to FIG. 2, in operation 201, an object tracking apparatus may obtain an initial template image from an input image and an input bounding box determined based on an input from a user.

In operation 203, the object tracking apparatus may generate an initial feature map by extracting features of the initial template image.

In operation 205, the object tracking apparatus may generate a transformed feature map by performing feature transformation adapted to objectness on the initial feature map.

In operation 207, the object tracking apparatus may generate an objectness probability map and a bounding box map indicating bounding box information corresponding to each coordinate of the objectness probability map by performing objectness-based bounding box regression analysis on the transformed feature map. The object tracking apparatus may generate the objectness probability map by performing classification on the transformed feature map. The object tracking apparatus may generate the bounding box map by performing localization on the transformed feature map.

In operation 209, the object tracking apparatus may determine a refined bounding box from the objectness probability map and the bounding box map. The object tracking apparatus may determine a first temporary bounding box from the objectness probability map and the bounding box map. The object tracking apparatus may determine the first temporary bounding box based on bounding box information of a bounding box map corresponding to a highest probability of the objectness probability map.

The object tracking apparatus may compare an area of the input bounding box and an area of the first temporary bounding box. The object tracking apparatus may compare a ratio of the input bounding box to the first temporary bounding box with a threshold. In response to the ratio of the input bounding box to the first temporary bounding box being greater than the threshold, the object tracking apparatus may determine a second temporary bounding box from the objectness probability map and the bounding box map.

The object tracking apparatus may determine the second temporary bounding box from the objectness probability map and the bounding box map based on a result of the comparing. The object tracking apparatus may determine the refined bounding box by comparing the first temporary bounding box and the second temporary bounding box. The object tracking apparatus may calculate a first IOU of the first temporary bounding box and the input bounding box. The object tracking apparatus may calculate a second IOU of the second temporary bounding box and the input bounding box. The object tracking apparatus may determine the refined bounding box by comparing the first IOU and the second IOU. In response to the first IOU being greater than the second IOU, the object tracking apparatus may determine the first temporary bounding box to be the refined bounding box. In response to the second IOU being greater than the first IOU, the object tracking apparatus may determine the second temporary bounding box to be the refined bounding box.

Figure 3:
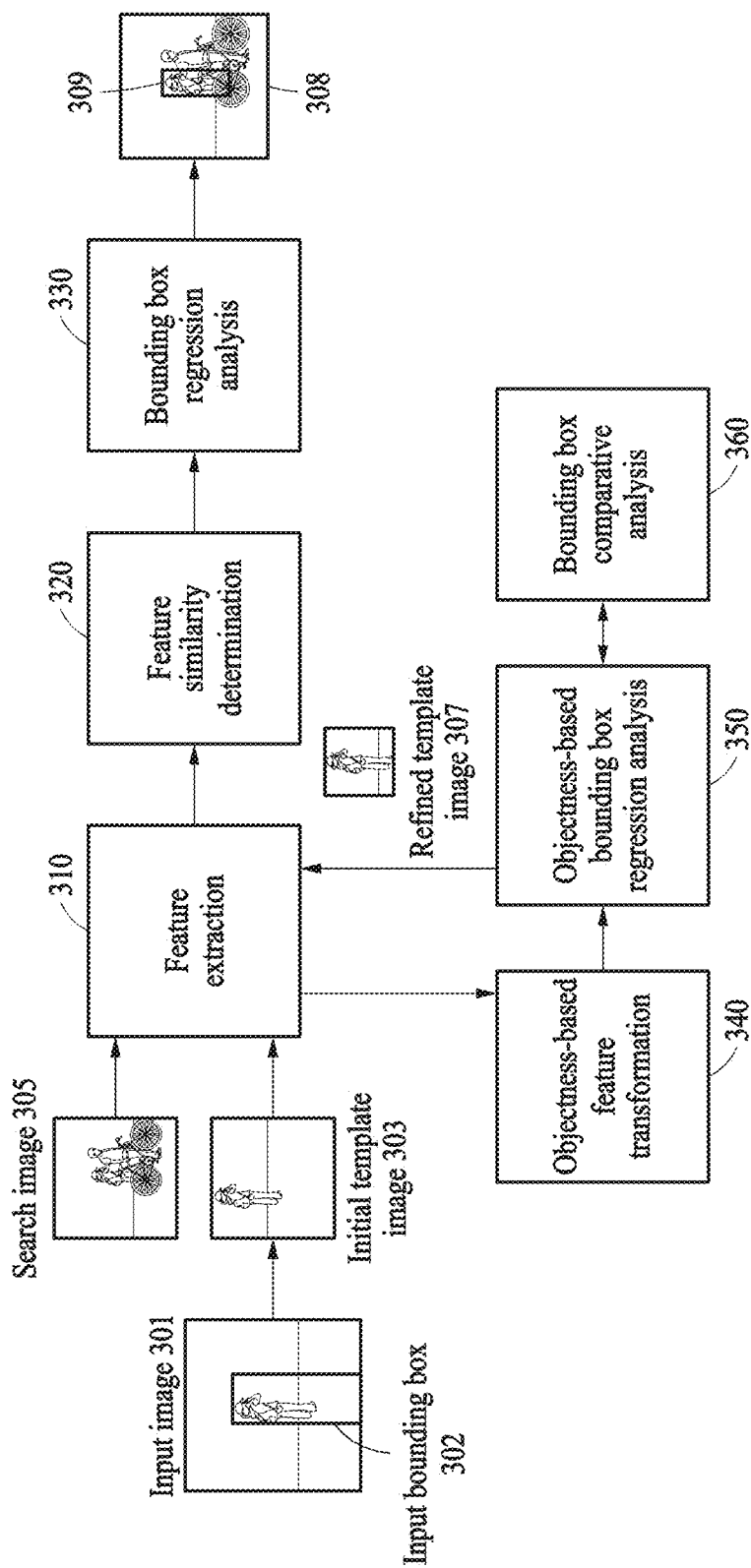
FIG. 3 is a block diagram illustrating an example of an object tracking method.

FIG. 3 is a block diagram illustrating an example of an object tracking method.

Referring to FIG. 3, an object tracking apparatus may determine an input bounding box 302 indicating a region of an object in an input image 301 based on an input from a user. The object tracking apparatus may determine an initial template image 303 based on the input bounding box 302. For example, the object tracking apparatus may obtain the initial template image 303 twice larger than the input bounding box 302, with the input bounding box 302 at the center.

The object tracking apparatus may perform feature extraction 310 on each of a search image 305 and the initial template image 303. In a non-limiting example, the initial template image 303 corresponds to an image of consecutive images and the search image 305 corresponds to a subsequent image of the consecutive images. The object tracking apparatus may extract a feature map of the search image 305 and a feature map of the initial template image 303 by inputting the search image 305 and the initial template image 303 to a neural network such that the search image 305 and the initial template image 303 to pass through one or more filters having pre-trained weights of the neural network. The feature maps may maintain information about the positions of signals of the respective images.

The object tracking apparatus may perform objectness-based feature transformation 340 on an initial feature map of the initial template image 303. A feature map extracted from the initial template image through feature transformation may be transformed to be more appropriate for objectness determination.

The object tracking apparatus may perform objectness-based bounding box regression analysis 350 on the transform feature map. The object tracking apparatus may determine objectness based on feature values obtained from the transformed template image.

The object tracking apparatus may correct the position and size of the bounding box based on a region having strong objectness. The object tracking apparatus may output one or more temporary bounding boxes. The object tracking apparatus may perform bounding box comparative analysis 360 on the one or more temporary bounding boxes. Through the bounding box comparative analysis, the object tracking apparatus may derive a refined bounding box more robust against changes in the scale of the object.

The object tracking apparatus may obtain a refined template image 307 based on the refined bounding box. For example, the object tracking apparatus may obtain the refined template image 307 twice larger than the refined bounding box, with the refined bounding box at the center.

The object tracking apparatus may perform feature similarity determination 320 on the feature map extracted from the search image 305 and a feature map extracted from the refined template image 307. For example, the object tracking apparatus may calculate the similarity through a cross-correlation method. The object tracking apparatus may estimate a bounding box indicating the position and region of the target based on a result of calculating the similarity. The object tracking apparatus may perform bounding box regression analysis 330 on a bounding box estimated with respect to the search image 305. The object tracking apparatus of one or more embodiments may output a bounding box 309 that more accurately indicates the object on a search image 308.

Figure 4:
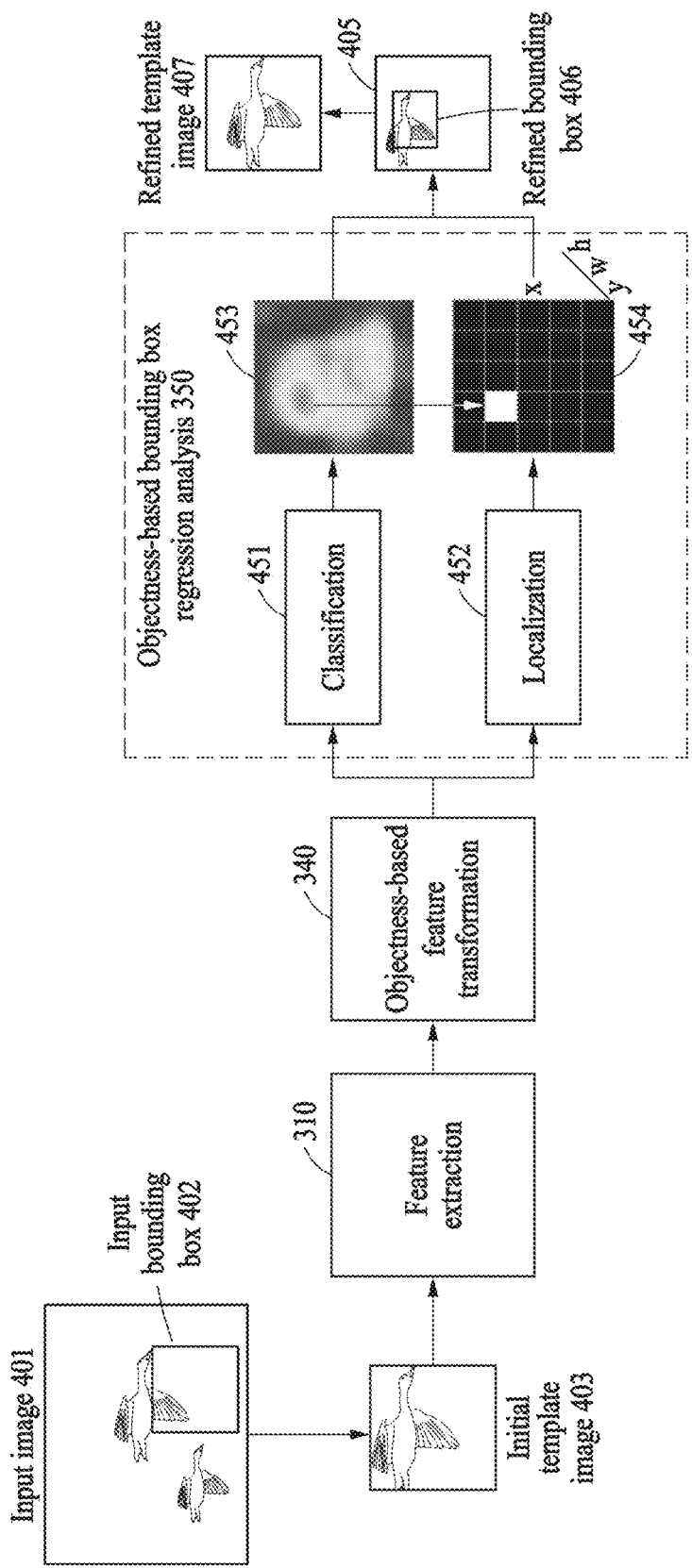
FIG. 4 is a block diagram specifically illustrating an example of a portion of an object tracking method.

FIG. 4 is a block diagram specifically illustrating an example of a portion of an object tracking method.

Referring to FIG. 4, an object tracking apparatus may determine an input bounding box 402 indicating a region of an object in an input image 401 based on an input from a user. The object tracking apparatus may determine an initial template image 403 based on the input bounding box 402. For example, the object tracking apparatus may obtain the initial template image 403 by adjusting the position of the input bounding box 402. As another example, the object tracking apparatus may obtain the initial template image 403 based on the input bounding box 402.

The object tracking apparatus may perform feature extraction 310 on each of a search image and the initial template image 403. The object tracking apparatus may perform objectness-based feature transformation 340 on the initial feature map of the initial template image 403.

The object tracking apparatus may perform objectness-based bounding box regression analysis 350 on the transform feature map. Objectness-based bounding box regression analysis 350 may include classification 451 and localization 452. The object tracking apparatus may output an objectness probability map 453 through classification 451. The object tracking apparatus may output a bounding box map indicating bounding box information estimated, assuming that the object is present at an arbitrary position in the transformed feature map, through localization 452 on the transformed feature map.

The object tracking apparatus may perform bounding box comparative analysis on one or more temporary bounding boxes. Through the bounding box comparative analysis, the object tracking apparatus may derive a refined bounding box 406 more robust against changes in the scale of the object from a portion 405 of the input image 401. The object tracking apparatus may obtain a refined template image 407 based on the refined bounding box 406.

Figure 5:
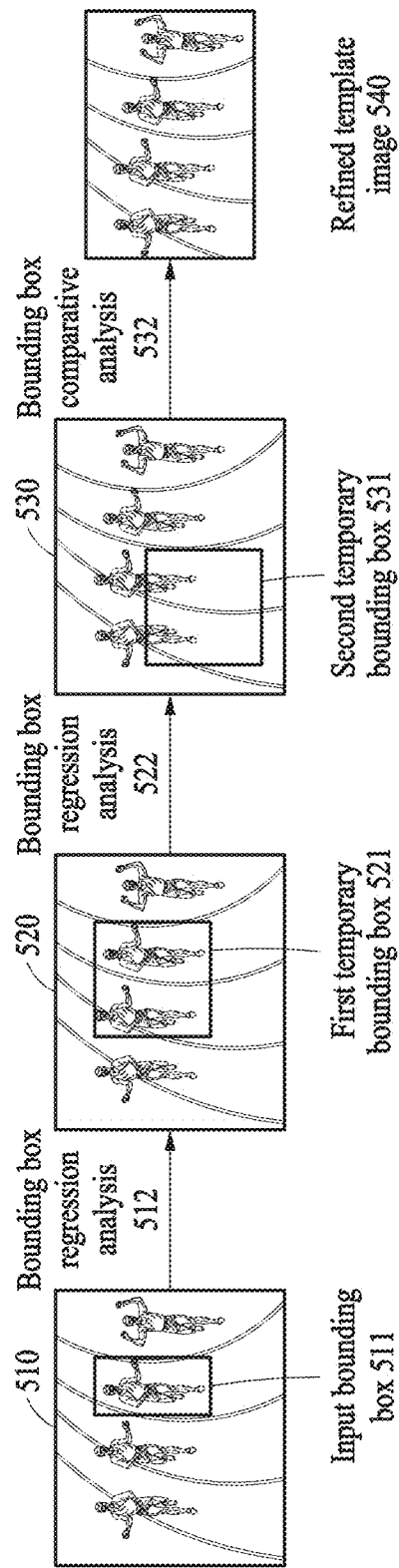
FIG. 5 illustrates an example of determining a refined bounding box by an object tracking method.

FIG. 5 illustrates an example of determining a refined bounding box by an object tracking method.

Referring to FIG. 5, an object tracking apparatus may determine an input bounding box 511 from an input image 510. The object tracking apparatus may perform bounding box regression analysis 512 on the input bounding box 511. A first temporary bounding box 521 may be determined from an input image 520 as a result of the bounding box regression analysis 512.

The object tracking apparatus may compare an area of the input bounding box 511 and an area of the first temporary bounding box 521. The object tracking apparatus may compare a ratio of the input bounding box 511 to the first temporary bounding box 521 with a threshold. In response to the ratio of the input bounding box 511 to the first temporary bounding box 521 being greater than the threshold, the object tracking apparatus may determine a second temporary bounding box 531 by performing bounding box regression analysis 522.

The object tracking apparatus may determine a refined bounding box by performing bounding box comparative analysis 532 on the first temporary bounding box 521 and the second temporary bounding box 531. The object tracking apparatus may calculate a first IOU of the first temporary bounding box 521 and the input bounding box 511. The object tracking apparatus may calculate a second IOU of the second temporary bounding box 531 and the input bounding box 511. The object tracking apparatus may determine the refined bounding box by comparing the first IOU and the second IOU. In response to the second IOU being greater than the first IOU, the object tracking apparatus may determine the second temporary bounding box 531 to be the refined bounding box. The object tracking apparatus may determine a refined template image 540 based on the refined bounding box.

Figure 6:
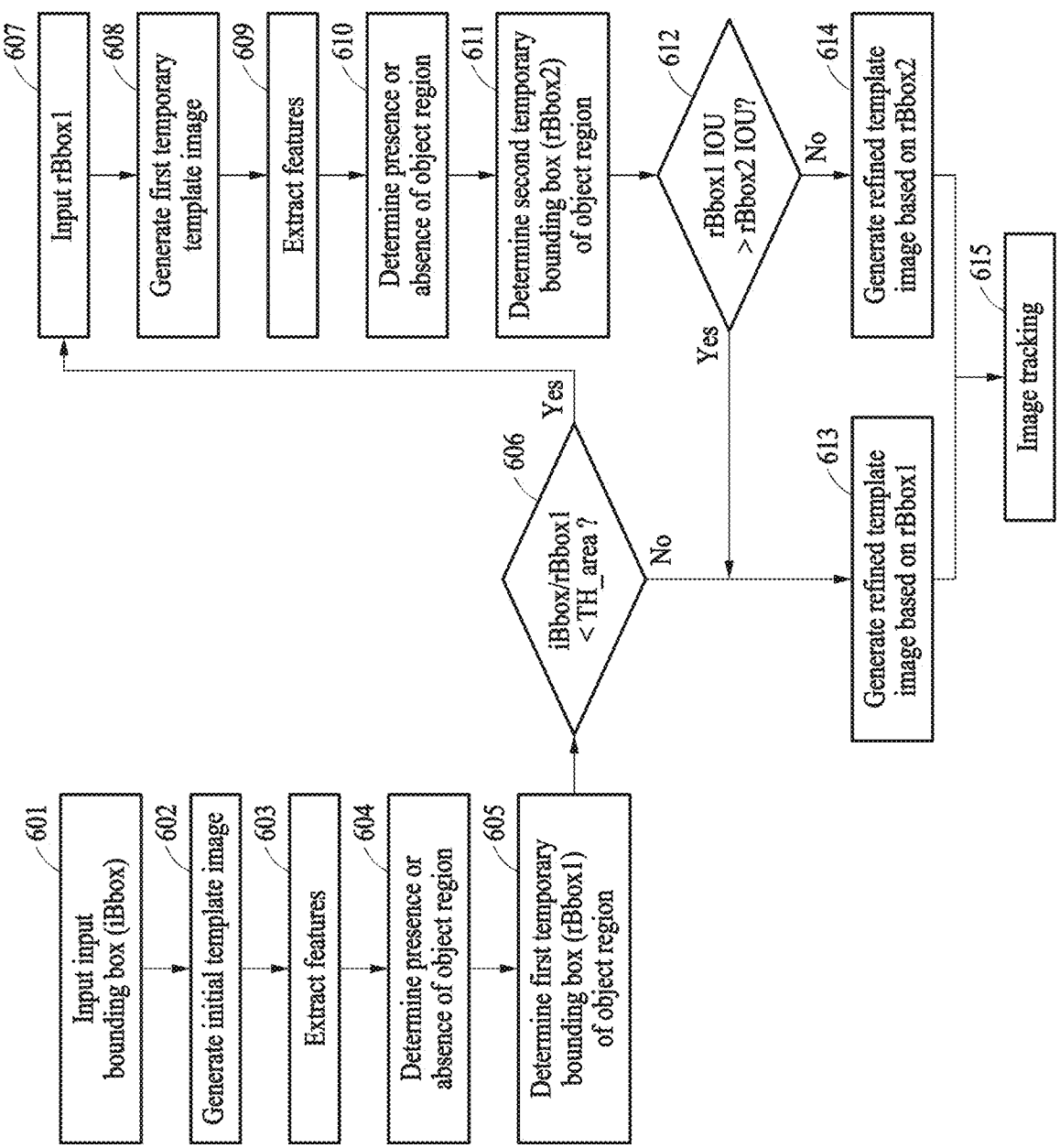
FIG. 6 is a flowchart illustrating an example of an object tracking method.

FIG. 6 is a flowchart illustrating an example of an object tracking method.

Referring to FIG. 6, in operation 601, an object tracking apparatus may input an input bounding box (iBbox). In operation 602, the object tracking apparatus may generate an initial template image from the input bounding box (iBbox). In operation 603, the object tracking apparatus may obtain an initial feature map by extracting features from the initial template image. The object tracking apparatus may obtain a transformed feature map by performing feature transformation on the initial feature map. In operation 604, the object tracking apparatus may determine the presence or absence of an object region in the transformed feature map. In operation 605, the object tracking apparatus may determine a first temporary bounding box (rBbox1) of the object region.

In operation 606, the object tracking apparatus may determine whether to determine another temporary bounding box by comparing an area of the input bounding box and an area of the initially determined temporary bounding box using Equation 1 described with reference to FIG. 1. In response to a difference between the area of the input bounding box and the area of the initially determined temporary bounding box being large, the object tracking apparatus may determine another temporary bounding box. In operation 613, in response to the difference between the area of the input bounding box and the area of the initially determined temporary bounding box being small, the object tracking apparatus may generate a refined template image based on the first temporary bounding box (rBbox1).

In operation 607, the object tracking apparatus may input the first temporary bounding box (rBbox1). In operation 608, the object tracking apparatus may generate a first temporary template image from the first temporary bounding box (rBbox1). In operation 609, the object tracking apparatus may obtain a feature map by extracting features from the first temporary template image. The object tracking apparatus may obtain a transformed feature map by performing feature transformation on the feature map. In operation 610, the object tracking apparatus may determine the presence or absence of an object region in the transformed feature map. In operation 611, the object tracking apparatus may determine a second temporary bounding box (rBbox2) of the object region.

In operation 612, the object tracking apparatus may determine a refined bounding box using Equation 2 described with reference to FIG. 1. In response to $IOU_{rBbox1}$ a first IOU of the first temporary bounding box rBbox1 and the input bounding box, being greater than $IOU_{rBbox2}$, which is a second IOU of the second temporary bounding box rBbox2 and the input bounding box, the object tracking apparatus may generate the refined template image based on the first temporary bounding box rBbox1, in operation 613. In the opposite case, in operation 614, the object tracking apparatus may generate the refined template image based on the second temporary bounding box rBbox2. In operation 615, the object tracking apparatus may perform image tracking based on the finally determined refined template image.

Figure 7A:
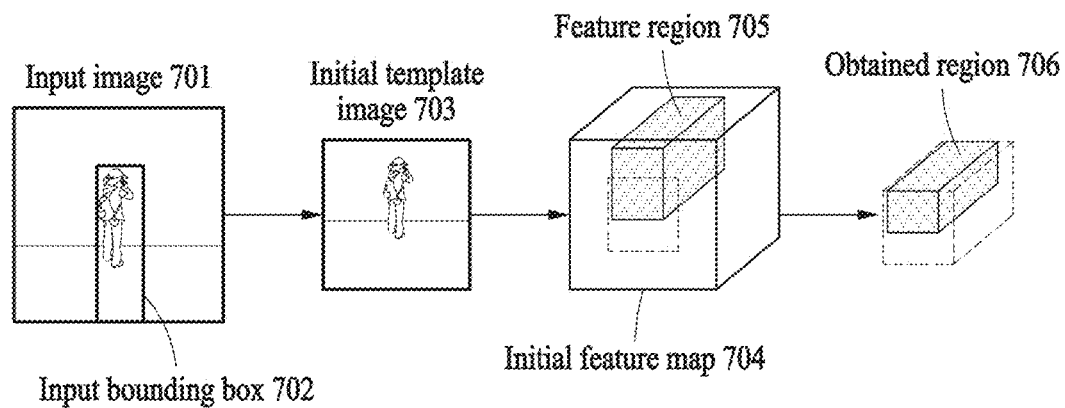
FIGS. 7A and 7B illustrate an example of an effect of an object tracking method.
Figure 7B:
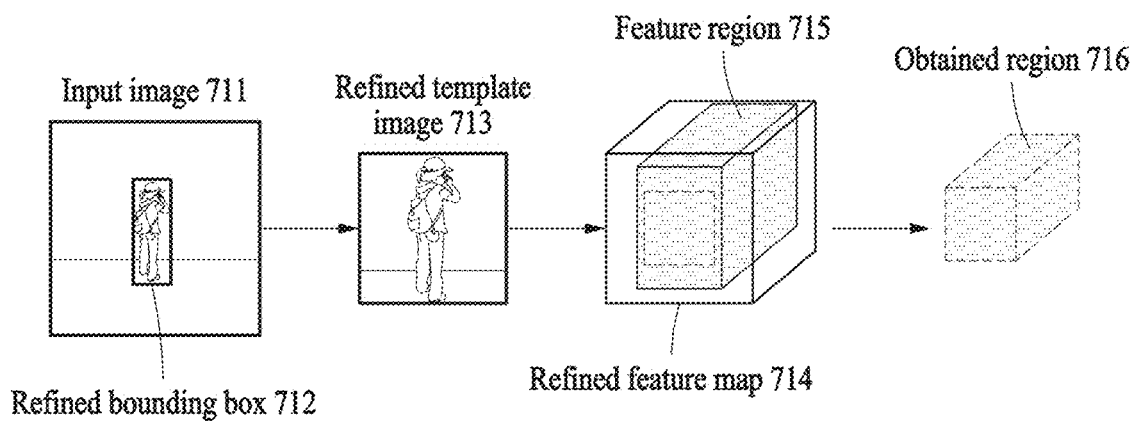

FIGS. 7A and 7B illustrate an example of an effect of an object tracking method.

Referring to FIGS. 7A and 7B, an object tracking apparatus may obtain an input bounding box 702 from an input image 701 based on an input from a user. The object tracking apparatus may obtain an initial template image 703 based on the input bounding box 702. The object tracking apparatus may obtain an initial feature map 704 from the initial template image 703. The initial feature map 704 may include a feature region 705 indicating position information of a signal of an object. The object tracking apparatus may obtain a region delimited by pre-defined broken lines in the initial feature map 704 as an obtained region 706.

The object tracking apparatus may obtain a refined bounding box 712 from an input image 711. The object tracking apparatus may obtain a refined template image 713 based on the refined bounding box 712. The object tracking apparatus may obtain a refined feature map 714 from the refined template image 713. The refined feature map 714 may include a feature region 715 indicating position information of a signal of an object. The object tracking apparatus may obtain a region delimited by pre-defined broken lines in the refined feature map 714 as an obtained region 716.

The input bounding box 702 includes a background region other than the object much, and thus the obtained region 706 may include only a portion of the feature region 705. In contrast, the refined bounding box 712 includes a background region other than the object less, and thus the obtained region 716 may include a core region of the feature region 715. Since the refined bounding box 712 determined by the object tracking apparatus of one or more embodiments includes the object more accurately and the unnecessary background region less, the accuracy of subsequent object tracking may increase.

Figure 8:
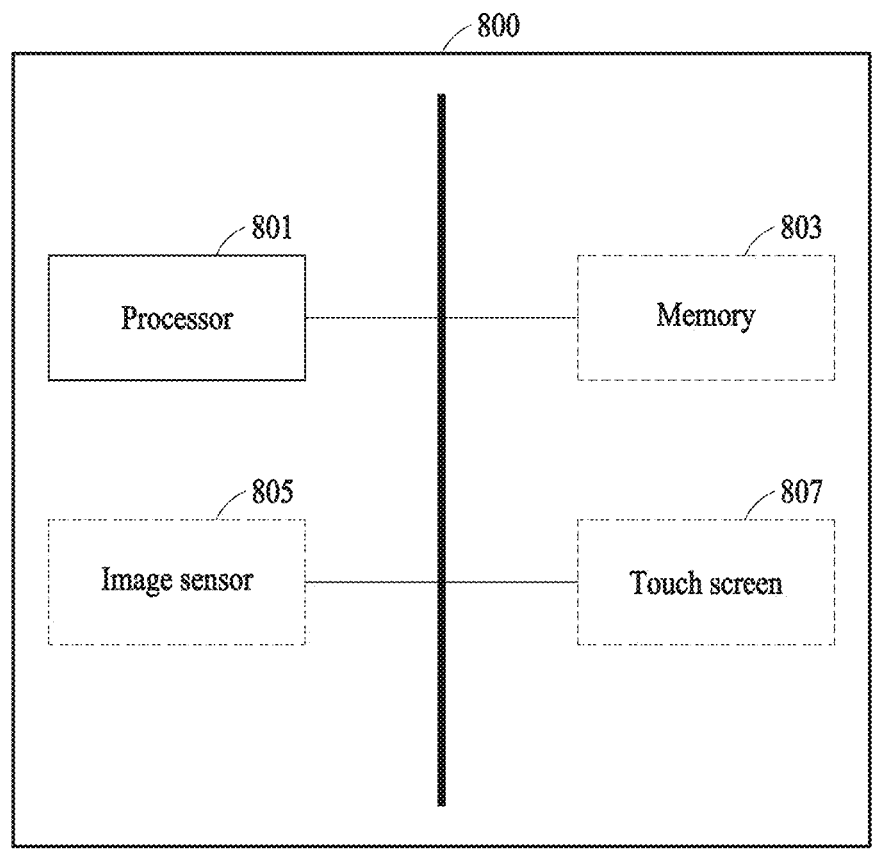
FIG. 8 illustrates an example of a configuration of an object tracking apparatus.

FIG. 8 illustrates an example of a configuration of an object tracking apparatus.

Referring to FIG. 8, an object tracking apparatus 800 may include a processor 801 (e.g., one or more processors). The object tracking apparatus 800 may further include a memory 803 (e.g., one or more memories). The object tracking apparatus 800 may further include an image sensor 805 (e.g., one or more image sensors). The object tracking apparatus 800 may further include a touch screen 807.

The processor 801 may obtain an initial template image from an input image and an input bounding box determined based on an input from a user.

The processor 801 may generate an initial feature map by extracting features of the initial template image.

The processor 801 may generate a transformed feature map by performing feature transformation adapted to objectness on the initial feature map.

The processor 801 may generate an objectness probability map and a bounding box map indicating bounding box information corresponding to each coordinate of the objectness probability map by performing objectness-based bounding box regression analysis on the transformed feature map. The processor 801 may generate the objectness probability map by performing classification on the transformed feature map. The processor 801 may generate the bounding box map by performing localization on the transformed feature map.

The processor 801 may determine a refined bounding box from the objectness probability map and the bounding box map. The processor 801 may determine a first temporary bounding box from the objectness probability map and the bounding box map. The processor 801 may determine the first temporary bounding box based on bounding box information of a bounding box map corresponding to a highest probability of the objectness probability map.

The processor 801 may compare an area of the input bounding box and an area of the first temporary bounding box. The processor 801 may compare a ratio of the input bounding box to the first temporary bounding box with a threshold. In response to the ratio of the input bounding box to the first temporary bounding box being greater than the threshold, the processor 801 may determine a second temporary bounding box from the objectness probability map and the bounding box map.

The processor 801 may determine the second temporary bounding box from the objectness probability map and the bounding box map based on a result of the comparing. The processor 801 may determine the refined bounding box by comparing the first temporary bounding box and the second temporary bounding box. The processor 801 may calculate a first IOU of the first temporary bounding box and the input bounding box. The processor 801 may calculate a second IOU of the second temporary bounding box and the input bounding box. The processor 801 may determine the refined bounding box by comparing the first IOU and the second IOU. In response to the first IOU being greater than the second IOU, the processor 801 may determine the first temporary bounding box to be the refined bounding box. In response to the second IOU being greater than the first IOU, the processor 801 may determine the second temporary bounding box to be the refined bounding box.

The object tracking apparatuses, processors, memories, image sensors, touch screens, object tracking apparatus 800, at least one processor 801, memory 803, image sensor 805, touch screen 807, and other apparatuses, devices, units, modules, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with object tracking, comprising:
   determining an initial template image based on an input bounding box and an input image;
   generating an initial feature map by extracting features from the initial template image;
   generating a transformed feature map by performing feature transformation adapted to objectness on the initial feature map;
   generating an objectness probability map and a bounding box map indicating bounding box information corresponding to each coordinate of the objectness probability map by performing objectness-based bounding box regression analysis on the transformed feature map; and
   determining a refined bounding box based on the objectness probability map and the bounding box map.

2. The method of claim 1, wherein
   the generating of the objectness probability map comprises generating the objectness probability map by performing classification on the transformed feature map; and
   the generating of the bounding box map comprises generating the bounding box map by performing localization on the transformed feature map.

3. The method of claim 1, wherein the determining of the refined bounding box comprises:
   determining a first temporary bounding box based on the objectness probability map and the bounding box map; and
   comparing an area of the input bounding box and an area of the first temporary bounding box.

4. The method of claim 3, wherein the determining of the first temporary bounding box comprises determining the first temporary bounding box based on bounding box information of a bounding box map corresponding to a highest probability of the objectness probability map.

5. The method of claim 3, wherein the comparing of the area of the input bounding box and the area of the first temporary bounding box comprises comparing a ratio of the input bounding box to the first temporary bounding box with a threshold.

6. The method of claim 3, wherein the determining of the refined bounding box comprises:
   determining a second temporary bounding box based on the objectness probability map and the bounding box map based on a result of the comparing; and
   determining the refined bounding box by comparing the first temporary bounding box and the second temporary bounding box.

7. The method of claim 6, wherein the determining of the second temporary bounding box comprises, in response to the ratio of the input bounding box to the first temporary bounding box being greater than the threshold, determining the second temporary bounding box based on the objectness probability map and the bounding box map.

8. The method of claim 6, wherein the determining of the refined bounding box by comparing the first temporary bounding box and the second temporary bounding box comprises:
   determining a first intersection of union (IOU) of the first temporary bounding box and the input bounding box;
   determining a second IOU of the second temporary bounding box and the input bounding box; and
   determining the refined bounding box by comparing the first IOU and the second IOU.

9. The method of claim 8, wherein the determining of the refined bounding box by comparing the first IOU and the second IOU comprises:
   in response to the first IOU being greater than the second IOU, determining the first temporary bounding box to be the refined bounding box; and
   in response to the second IOU being greater than or equal to the first IOU, determining the second temporary bounding box to be the refined bounding box.

10. A non-transitory computer-readable storage medium storing instructions that, when executed by one or more processors, configure the one or more processors to perform the method of claim 1.

11. An apparatus with object tracking, comprising:
    one or more processors configured to:
    determine an initial template image based on an input bounding box and an input image;
    generate an initial feature map by extracting features of the initial template image;
    generate a transformed feature map by performing feature transformation adapted to objectness on the initial feature map;
    generate an objectness probability map and a bounding box map indicating bounding box information corresponding to each coordinate of the objectness probability map by performing objectness-based bounding box regression analysis on the transformed feature map; and
    determine a refined bounding box based on the objectness probability map and the bounding box map.

12. The apparatus of claim 11, wherein, for the determining of the refined bounding box, the one or more processors are configured to determine the refined bounding box based on bounding box information of a bounding box map corresponding to a highest probability of the objectness probability map.

13. The apparatus of claim 11, wherein the one or more processors are configured to:
    for the generating of the objectness probability map, generate the objectness probability map by performing classification on the transformed feature map, and
    for the generating of the bounding box map, generate the bounding box map by performing localization on the transformed feature map.

14. The apparatus of claim 11, wherein, for the determining of the refined bounding box, the one or more processors are configured to:
    determine a first temporary bounding box based on the objectness probability map and the bounding box map, and
    compare an area of the input bounding box and an area of the first temporary bounding box.

15. The apparatus of claim 14, wherein, for the determining of the first temporary bounding box, the one or more processors are configured to determine the first temporary bounding box based on bounding box information of a bounding box map corresponding to a highest probability of the objectness probability map.

16. The apparatus of claim 14, wherein, for the comparing of the area of the input bounding box and the area of the first temporary bounding box, the one or more processors are configured to compare a ratio of the input bounding box to the first temporary bounding box with a threshold.

17. The apparatus of claim 14, wherein, for the determining of the refined bounding box, the one or more processors are configured to:

determine a second temporary bounding box based on the objectness probability map and the bounding box map based on a result of the comparing, and determine the refined bounding box by comparing the first temporary bounding box and the second temporary bounding box.

18. The apparatus of claim 17, wherein, for the determining of the second temporary bounding box, the one or more processors are configured to, in response to the ratio of the input bounding box to the first temporary bounding box being greater than the threshold, determine the second temporary bounding box based on the objectness probability map and the bounding box map.

19. The apparatus of claim 17, wherein, for the determining of the refined bounding box by comparing the first temporary bounding box and the second temporary bounding box, the one or more processors are configured to:

calculate a first intersection of union (IOU) of the first temporary bounding box and the input bounding box, calculate a second IOU of the second temporary bounding box and the input bounding box, and determine the refined bounding box by comparing the first IOU and the second IOU.

20. The apparatus of claim 19, wherein, for the determining of the refined bounding box by comparing the first IOU and the second IOU, the one or more processors are configured to:

in response to the first IOU being greater than the second IOU, determine the first temporary bounding box to be the refined bounding box, and in response to the second IOU being greater than or equal to the first IOU, determine the second temporary bounding box to be the refined bounding box.

21. A processor-implemented method with object tracking, comprising:

generating an objectness probability map and a bounding box map by performing objectness-based bounding box regression analysis based on an input bounding box and an input image;

determining a first temporary bounding box and a second temporary bounding box based on the maps;

determining a refined bounding box to be either one of the first temporary bounding box and the second temporary bounding box by comparing the temporary bounding boxes; and performing object tracking based on the refined bounding box.

22. The method of claim 21, wherein a proportion of the refined bounding box that is a background region is less than a proportion of the input bounding box that is the background region.

23. The method of claim 21, wherein the determining of first temporary bounding boxes comprises determining the second temporary bounding box in response to an area ratio of the input bounding box to the first temporary bounding box being greater than the threshold.

24. The method of claim 21, wherein the determining of the refined bounding box comprises determining refined bounding box to be the second temporary bounding in response to an intersection of union (IOU) of the second temporary bounding box and the input bounding box being greater than or equal to an IOU of the first temporary bounding box and the input bounding box.

25. The method of claim 21, wherein the performing of the object tracking comprises determining a bounding box in a subsequent image based on the refined bounding box.

* * * * *